United States Patent
Seth et al.

(10) Patent No.: US 8,909,630 B1
(45) Date of Patent: Dec. 9, 2014

(54) FINDING QUERY OFFSETS OF SIMILAR GEOGRAPHIC FEATURES

(75) Inventors: Rohan Seth, San Francisco, CA (US);
Joshua J. Sacks, San Carlos, CA (US);
Michele Covell, Palo Alto, CA (US);
Michael Chu, Los Altos Hills, CA (US);
Shumeet Baluja, Leesburg, VA (US);
David Marwood, San Francisco, CA (US)

(73) Assignee: Google Inc., Mountain View, CA (US)

( * ) Notice: Subject to any disclaimer, the term of this patent is extended or adjusted under 35 U.S.C. 154(b) by 811 days.

(21) Appl. No.: 13/116,572

(22) Filed: May 26, 2011

(51) Int. Cl.
*G06F 17/30* (2006.01)

(52) U.S. Cl.
USPC .......................................... 707/724

(58) Field of Classification Search
CPC ................................................. G06F 17/30241
USPC .......................................... 707/724
See application file for complete search history.

(56) References Cited

U.S. PATENT DOCUMENTS

2010/0161591 A1* 6/2010 Jones et al. ................. 707/722

* cited by examiner

*Primary Examiner* — Huawen Peng
(74) *Attorney, Agent, or Firm* — McDermott Will & Emery LLP

(57) ABSTRACT

Methods, systems, and apparatus, including computer programs encoded on a computer storage medium, including a method that comprises: determining excess queries for a target geographic feature, where the geographic feature defines a location; determining one or more candidate geographic features that have similar excess queries, but displaced in time; determining a time offset between the target geographic feature and a candidate geographic feature based on the displacement in time of the similar excess queries; and targeting content to the candidate geographic feature using the time offset and based on content targeted to the target geographic feature.

20 Claims, 8 Drawing Sheets

|  | Time Period 1 | Time Period 2 | Time Period 3 | Time Period 4 |
|  | 404a | 404b | 404c | 404d |

City A 402a

| Query | Excess Query Count | Excess Query Count | Excess Query Count | Excess Query Count |
|---|---|---|---|---|
| $Q_1$ | - | - | - | - |
| $Q_2$ | - | - | - | - |
| $Q_3$ | - | - | - | - |
| $Q_4$ | - | - | - | - 408a |
| $Q_5$ | 2,000 | 4,000 | 6,000 | 2,000 |
| $Q_6$ | 500 | 500 | 500 | 500 |
| $Q_7$ | - | - | - | - 410a |
| $Q_8$ | 4,000 | 8,000 | 16,000 | 4,000 |
| $Q_9$ | 100 | 100 | 100 | 100 |
| $Q_{10}$ | 200 | 200 | 200 | 200 |

City B 402b

| Query | Excess Query Count | Excess Query Count | Excess Query Count | Excess Query Count |
|---|---|---|---|---|
| $Q_1$ | - | - | - | - |
| $Q_2$ | - | - | - | - |
| $Q_3$ | - | - | - | - |
| $Q_4$ | - 408b | - | - | - |
| $Q_5$ | 1,000 | 1,100 | 2,200 | 4,300 |
| $Q_6$ | 250 | 280 | 220 | 250 |
| $Q_7$ | - 410b | - | - | - |
| $Q_8$ | 2,000 | 2,200 | 4,200 | 8,300 |
| $Q_9$ | 100 | 100 | 1,437 | 100 |
| $Q_{10}$ | 200 | 200 | 200 | 200 |

City C 402c

| Query | Excess Query Count | Excess Query Count | Excess Query Count | Excess Query Count |
|---|---|---|---|---|
| $Q_1$ | 9,000 | 9,000 | 9,000 | 9,000 |
| $Q_2$ | - | - | - | - |
| $Q_3$ | 7,000 | 6,000 | 8,000 | 7,000 |
| $Q_4$ | - | - | - | - |
| $Q_5$ | - | - | - | - |
| $Q_6$ | 12,000 | 14,000 | 8,000 | 11,000 |
| $Q_7$ | - | - | - | - |
| $Q_8$ | 3,000 | 3,000 | 3,000 | 3,000 |
| $Q_9$ | - | - | - | - |
| $Q_{10}$ | - | - | - | - |

Conclusion: City B is a similar geographic feature to City A — 406

FIG. 4

FINDING QUERY OFFSETS OF SIMILAR GEOGRAPHIC FEATURES

BACKGROUND

This specification relates to information presentation.

The Internet provides access to a wide variety of resources such as video and audio files, web pages for particular subjects, book articles, and news articles. A search system can identify resources in response to a text query that includes one or more search terms or phrases. The search system can rank the resources based on their relevance to the query and on measures of quality of the resources and can provide search results that link to the identified resources. The search results are typically ordered for viewing according to the rank.

Some search systems can obtain or infer a location of a user device from which a search query was received and include local search results that are responsive to the search query. In some systems, local search results are search results that have been classified as having local significance to the particular location of the user device. For example, in response to a search query for "coffee shop," the search system may provide local search results that reference web pages for coffee shops near the location of the user device.

Some search queries may include location information as part of the query. For example, a search query may include a specific location, landmark, geographic feature, region or other location designator.

Still other queries may include terms that are more relevant to one or more geographic locations or regions. For example, some users in some parts of the United States may submit the search query "rock quarry" more often than users in other areas. There may be one or more geographic regions where a rock quarry is a local tourist attraction, for example. The frequency of search queries, such as for "rock quarry," may change over time, and changes in the frequency may differ by geographic region.

SUMMARY

This specification describes technologies relating to information presentation.

In general, one innovative aspect of the subject matter described in this specification can be implemented in methods that include a method that comprises: determining excess queries for a target geographic feature, where the geographic feature defines a location; determining one or more candidate geographic features that have similar excess queries, but displaced in time; determining a time offset between the target geographic feature and a candidate geographic feature based on the displacement in time of the similar excess queries; and targeting content to the candidate geographic feature using the time offset and based on content targeted to the target geographic feature.

These and other implementations can each optionally include one or more of the following features. Each geographic feature can be a city. Determining excess queries can include: accessing a search query log that includes data specifying search queries corresponding to a particular geographic feature; and for at least one of the search queries corresponding to the particular geographic region: generating a geo-query count that represents a total number of times that the search query was received over a specified period; comparing the geo-query count to a corresponding expected query count for the search query, the expected query count being a baseline number of times that the query is expected to be received; and in response to determining that the search query has a geo-query count that exceeds the corresponding expected query count by at least a threshold amount, classifying the particular query as an excess query for the particular geographic feature. The method can further comprise determining excess queries for a geographic feature over multiple time periods. The multiple time periods can be separated in time by one or more intervals. Determining one or more candidate geographic features can include determining a number of excess queries in common between two geographic features. Determining one or more candidate geographic features can include determining a similarity threshold equal to a minimum number of excess queries that must be shared between two geographic features in order to find similarity. The method can further comprise determining one or more geographic features that share a number of excess queries that is greater than the similarity threshold for the target geographic feature. Comparing geographic features for similarity can include determining a quality of the excess queries shared by the target geographic feature and a candidate geographic feature. The quality can be measured based at least in part on a volume of queries associated with the excess queries. The quality can be measured based at least in part on click-through rates associated with the excess queries. The quality can be measured using semantic clustering of terms by meaning. Determining one or more candidate geographic features can include comparing a number of shared excess queries and a number of dissimilar excess queries for the target geographic feature and a candidate geographic feature. Comparing a number of dissimilar excess queries can include determining if the number of dissimilar excess queries exceeds a dissimilarity threshold, and determining that the target geographic feature and candidate geographic feature are not similar if the number of dissimilar excess queries exceeds the dissimilarity threshold. The method can further comprise: attributing information associated with one geographic feature with a similar geographic feature; and using the attributed information to target content to the similar geographic feature. The information can be targeting information. The information can be a label associated with the one geographic feature. Determining excess queries over for a given geographic feature can further include: for one or more time periods, determining a query volume for every query in every geographic feature; for every query, calculating a volume of each query across all geographic features; for every geographic feature, calculating a volume of query across all queries; calculating a total volume of queries; and calculating an excess for each query in each geographic feature. The method can further comprise creating a multi-dimensional array based on the excess queries per geographic feature. The method can further comprise using the multi-dimensional array to determine similar geographic features.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a block diagram illustrating relationships among excess query counts for different geographic features over multiple time periods.

Like reference numbers and designations in the various drawings indicate like elements.

DETAILED DESCRIPTION

This document describes methods, processes and systems for determining that one or more geographic features are similar because, for example, they have similar queries, but displaced in time. A time offset, for example, can be determined using similar queries between a target geographic feature and a candidate geographic feature. In some implementations, content (e.g., Internet content), can be targeted to the candidate geographic feature using the time offset and based on content targeted to the target geographic feature, which has been determined to be similar. In some implementations, determining that geographic features are similar, for example, can use information about search queries that are considered to be local search queries. Other methods for determining similarity between features can be used. For example, similarity between features can be based on excess queries, or a measure of the number of queries for a location that is in excess of an expected number of queries for that location.

Figure 1:
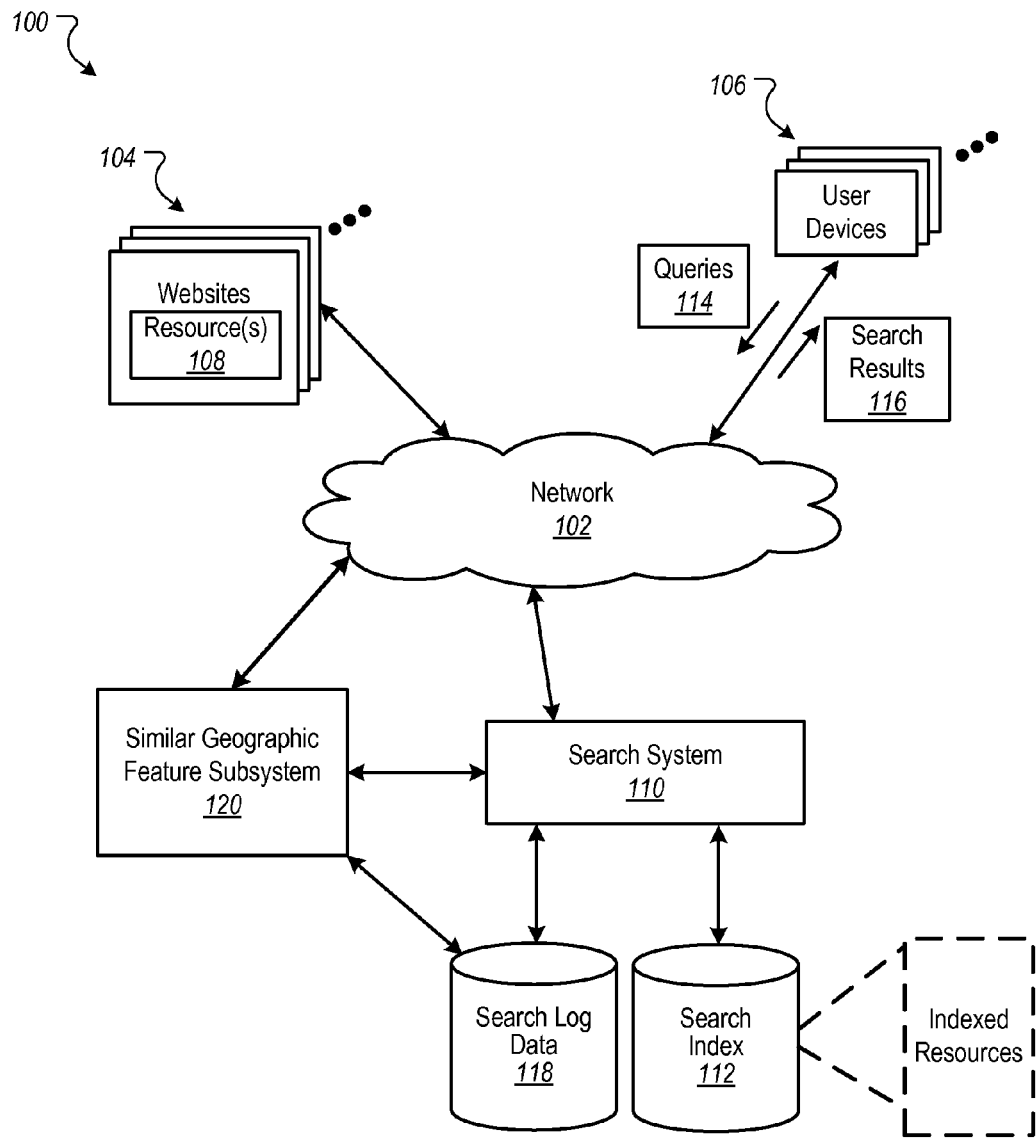
FIG. 1 is a block diagram of an example environment for determining, and targeting content to, similar geographic features.

FIG. 1 is a block diagram of an example environment 100 for determining, and targeting content to, similar geographic features. For example, users in or associated with various geographic features (e.g., cities) may use the environment 100 to navigate to web sites, search for and view content, and receive served content, including ads. When user factors (e.g., preferences and/or actions) in one city are related to user factors in another city (e.g., based on similar content served, similar queries, etc.), the cities can be said to be similar geographic features. Two features can be determined to be similar, for example, based on patterns or statistics of past content served, queries, etc. In some implementations, the similarity between two features can be based on factors that are offset in time. For example, users in City Y may generally lag behind users in City X by a certain time offset (e.g., a day, week or month) regarding a certain factors. This type of time offset can be determined between two similar geographic features. Further, the information for similar geographic features and the time offset can be used to target content. For example, the same or similar content (e.g., ads) can be targeted to users in City Y that has been served to users in City X. The content can be targeted to City Y, for example, at a certain time offset later (e.g., a day, week or month), as determined by the methods proposed.

The environment 100 includes a search system 110 that provides search services and a similar geographic feature subsystem 120 that analyzes historical content, such as queries, to determine similar geographic features (e.g., based on the queries). The environment 100 includes a network 102, e.g., a local area network (LAN), wide area network (WAN), the Internet, or a combination of them, that connects publishers 104, user devices 106, the search system 110, and the similar geographic feature subsystem 120. The environment 100 may include many thousands of publishers and user devices 106.

A search log data store 118 can store search queries submitted during user sessions. In some implementations, location data specifying a locality of the user device that submitted the search query can also be stored in the search log data store 118. In some implementations, a time element associated with each query can also be stored in the search log data store 118. For example, using information in the search log data store 118, a system (e.g., similar geographic feature subsystem 120) can identify the queries that were submitted, the locations from which the queries were submitted, and when the queries were submitted.

The similar geographic feature subsystem 120, for example, can perform statistical analyses of queries for different geographic features (e.g., different cities) to determine similarities among the different geographic features. Other mechanisms can be used to determine similarity of geographic features. For example, two geographic features may be deemed similar based on physical properties shared by the features (e.g., size, number of people, number of roads, climate, or other physical features attributable to the feature) or proximity. Other measures of similarity are possible. In some implementations, instead of (or in addition to) using excess queries, the similar geographic feature subsystem 120 can use query volume and/or query proportions to determine similar excess queries. In some implementations, the highest volume (e.g., the top five) queries and lowest volume (e.g., the bottom five) queries can be compared for similarity. In some implementations, the similar geographic feature subsystem 120 can compare non-query-related information for geographic features, such as Census data, weather/climate patterns, immigration/emigration patterns, and/or web sites visited (e.g., by users in each geographic feature).

A web site 104 can include one or more resources 108 associated with a domain name and hosted by one or more servers. An example web site is a collection of web pages formatted in hypertext markup language (HTML) that can contain text, images, multimedia content, and programming elements (e.g., scripts). Each web site 104 can be maintained by a publisher, e.g., an entity that manages and/or owns the web property.

A resource 108 is any data that can be provided by the web site 104 over the network 102 and that is associated with a resource address. Resources 108 include HTML pages, word processing documents, portable document format (PDF) documents, images, video, and feed sources, to name a few examples. The resources 108 can include content, e.g., words, phrases, images and sounds, and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes a user application, e.g., a web browser, to facilitate the sending and receiving of data over the network 102.

To facilitate searching of resources 108, the search system 110 can identify the resources 108 by crawling and indexing the resources 108 provided by the publishers 104. Data about the resources 108 can be indexed based on the resource 108 to which the data corresponds. The indexed and, optionally, cached copies of the resources 108 are stored in a search index 112.

The user devices 106 submit search queries 114 to the search system 110. In response, the search system 110 accesses the search index 112 to identify resources 108 that are predicted to be relevant to the search query 114, for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text or a portion of an image extracted from the web page, and the URL of the web page.

User devices 106 receive the search results 116 and render the search results 116, for example, in the form of one or more web pages, for presentation to users. In response to the user selecting a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search queries 114 submitted during user sessions are stored in a data store such as the search log data store 118. Selection data specifying user actions taken in response to search results 116 provided are also stored in a data store such as the search log data store 118. These actions can include whether a search result was selected by a user. The data stored in the search log data store 118 can be used to map search queries 114 submitted during search sessions to resources 108 that were identified in search results 116 and the actions taken by users.

Search results 116 are selected to be provided to a user device 106 in response to a search query 114 based on initial result scores. Result scores are scores that represent a measure of relevance (e.g., a predicted relevance) of the resource 108 to a search query. For example, a result score for a resource 108 can be computed based on an information retrieval ("IR") score corresponding to the resource 108 and, optionally, a quality score of the resource 108 relative to other available resources. A presentation order for the search results 116 can be selected based on the result scores. In turn, data that causes presentation of the search results 116 according to the presentation order can be provided to the user device 106.

In some implementations, the relevance of a particular resource to a particular search query can be determined, in part, through statistical analysis of search log data 118. Search log data is data that specifies search queries received from users and subsequent user selections (i.e., clicks) of particular search results. For example, information in the search log data store 118 may specify that the search query "football" was received from 1,000,000 users, and that 100,000 of these users subsequently selected a search result referencing a web page for a professional football league, while 150,000 of these users selected a web page for a college football league.

Figure 2:
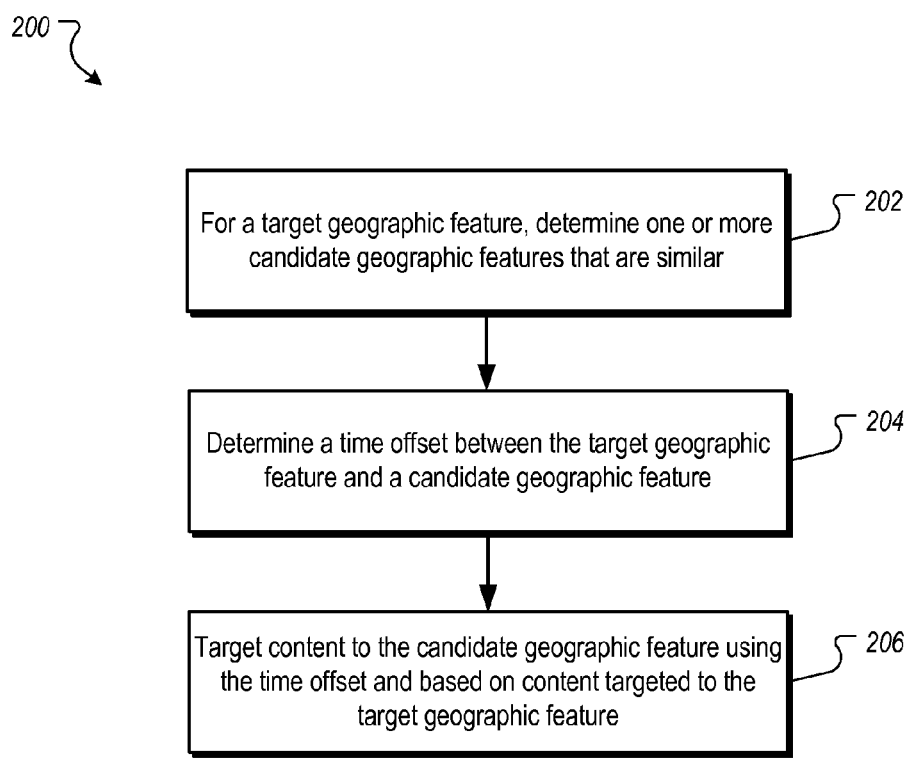
FIG. 2 is a flow chart of an example process for targeting content based on similar geographic features with a time offset.

FIG. 2 is a flow chart of an example process 200 for targeting content based on similar geographic features with a time offset. The process 200 can be used to target content, such as ads, to one or more candidate geographic features for a given target geographic feature. The target geographic feature, for example, can be a city to which content has been served. The candidate geographic features, for example, can be other cities that can be chosen for which to serve content, where the content served is selected, at least in part, because the candidate cities are similar geographic features to the target city. By targeting content in this way, ad campaigns can be more successful because the users in the targeted cities (i.e., the candidate geographic features) can be more likely to be interested in the ads.

For a target geographic feature, one or more candidate geographic features that are similar are determined (202). The geographic feature defines a location. For example, for a target geographic feature (e.g., a city), the similar geographic feature subsystem 120 can identify one or more other geographic features (e.g., cities) that are similar to the target feature. In some implementations, the similar geographic feature subsystem 120 can identify the other cities as similar geographic features because they have queries that are similar to the target city's queries. For example, the similar geographic feature subsystem 120 can use information from the search log data store 118 to analyze past search queries of the target city and the candidate cities.

A time offset is determined between the target geographic feature and a candidate geographic feature (204). For example, the similarity between a geographic feature and a target geographic feature can exist because one of more similarities between the target feature at one time and the candidate feature at a later time. In some implementations, the similarity between the target city and candidate cities can be based on similar patterns of queries over time. For example, patterns of certain past queries from a city on the West Coast in January may correlate to patterns of the same past queries from a city on the East Coast, then peaking in February. In this example, the time offset determined can be one month.

Content is targeted to the candidate geographic feature using the time offset and based on content targeted to the target geographic feature (206). For example, using the one month time offset, the content (e.g., ads) that is served to the West Coast city in March can be targeted to the East Coast city in April based on the cities' similarity and corresponding time offset.

The examples in this document focus primarily on serving online content. However, the same types of analysis of user (or consumer) interest over time, including interest by users in different geographic regions over time periods that are offset in time, can be used to target consumers using other media including television, radio, print (e.g., newspapers, magazines, etc.), or direct mail. Thus, information regarding similar geographic features can be used to serve or deliver any type of media.

Geographic features can be identified as similar geographic features in various ways (e.g., by the similar geographic feature subsystem 120). In some implementations, for example, the similar geographic feature subsystem 120 can use ways for determining similar geographic features that include the use of analyzing local queries. For example, two cities can be identified to be similar geographic features if the numbers and/or patterns of local search queries by users in those cities are similar. In some implementations, the local queries can include the queries that come from users in a particular location (e.g., a city), such as based on the physical location of the user's computer at the time the queries were made.

A search query can be identified as a geographically local ("local") search query for a particular geographic feature (e.g., a geographic region, such as a city) based on a number of times that the search query is received from users located in the particular geographic region. This quantification can be referred to as a geo-query count for the particular geographic region. For example, the geo-query count for a particular geographic region can be compared to a corresponding expected query count for that geographic region to determine whether the geo-query count exceeds the corresponding expected query count. If the geo-query count exceeds the expected query count by a pre-determined threshold, for example, then the search query can be classified as a local search query for the particular geographic region.

The expected query count is a baseline number of queries that are expected to be received, over a specified period of time, from user devices in the particular geographic region. The expected query count can be computed, for example, based on a query share for the query and a total number of queries that have been received from user devices in the particular geographic region. The query share represents a portion of the total queries that are expected to match the search query. For example, the query share can be computed as a ratio of the number of times that the search query was received from user devices in a baseline, or reference, geographic region (e.g., the United States) relative to the total number of queries that have been received from user devices in the baseline geographic region. As an example, the query share for the query "football" can be 0.01 if one million queries for "football" are received in the United States out of one hundred million total queries (of all types) received in the United States, over the same time period. The query share for the query can be multiplied by the total number of queries received from user devices in the particular geographic region to compute the expected query count for the query.

When determining whether a query is a local query, the amount by which the geo-query count exceeds the expected query count is an excess query count. For example, the excess query count can correspond to a particular query for a given geographic feature over a specific time period. Excess query counts can also be determined for other geographic features and other time periods, and the information can be stored. By comparing excess query counts for different geographic features over multiple time periods, similarities among different geographic features can be determined. As a result, for any given geographic feature, one or more other similar geographic features can be determined. For example, for San Francisco, one or more other cities in the US can be determined to be similar cities based on similarities among the excess query counts for San Francisco and the other cities.

In some implementations, analyzing the excess queries of multiple geographic features to determine similar geographic features can be performed for the purposes of serving content. For example, the analysis can compare the excess queries that two or more cities share. If the cities share a significant number or amount of excess queries, for example, the cities can be designated as similar geographic features. In some implementations, advertisers and publishers can use the information for similar geographic features, for example, to target and serve content. The targeted content can include ads that can be served to one or more cities that are similar to a city where the content (or ad) is already known to be popular (e.g., based on the number of clicks, etc.). In this way, the advertisers and publishers can target content to users who may be most likely interested in the content.

In some implementations, sets of similar geographic features (e.g., cities) can be identified and used to predict content-related behavior in a target geographic feature, e.g., by examining the excess queries for the geographic features as a function of time. The cities need not be geographically close to each other, but rather the cities share related queries, and in particular, excess queries corresponding to local queries that emanate from users in the similar cities. In particular, multiple time periods can be used to determine patterns of excess queries among multiple queries for different cities. As an example, cities such San Jose, Calif. and other tech centers (e.g., Cambridge, Mass.; Redmond, Wash.; etc.) may include communities of users who generally submit tech-related queries in numbers that exceed expected numbers, e.g., as compared to average cities. For example, the tech-related queries from these cities may include a higher than average number of queries related to academics, medicine, research, computers and the like. In some implementations, having information regarding which cities are related in this way can provide advertisers and content publishers with suggestions of where next (or where not) to deploy their content based on other currently well-performing (or poorly-performing) cities. For example, an ad campaign that does well in San Jose can be targeted next to users in Cambridge, Redmond and other similar high-tech cities.

In some implementations, geographic features can be deemed to be similar but shifted in time. For example, by analyzing excess queries, users in a city on the West Coast may be determined to be interested in a particular high-tech device starting in January and February, then peaking in April and May. The same analysis and/or different analyses may determine that users in a city in the Midwest are interested in the same high-tech device, but with respect to a lag time. For example, the interest by users in the Midwest may start in February and/or March, and then peak in May and/or June. Another example includes weather-related lag times, such as lag times corresponding to geographic features (e.g., as evidenced by excess queries) associated with "snow shovel" queries that start in one state and follow the path of a snow storm. In this example, the lag time in queries can produce a time offset of a few days or less, such as several hours. Once determined, offsets can be used to predict behavior of users in similar geographic features but merely offset in time.

In one specific example, information from the search log data store 118 can be used to identify cities that have statistically similar excess queries. For example, some measures that can be used to determine that cities have statistically similar excess queries can be based on the number of queries or the timing of those queries. In some implementations, information associated with one geographic feature can be attributed to a similar geographic feature, and the attributed information can be used to target content to the similar geographic feature. For example, ads or other content that appears (e.g., as ad impressions or other content) in one city can be targeted to users in another similar city. In some implementations, the similar geographic feature subsystem 120 can be implemented as an element of the search system 110. In some implementations, the similar geographic feature subsystem 120 can be implemented in a data processing apparatus that communicates over the network 102 with the search system 110.

In some implementations, the attributed information can be a label or other form of characterization that is associated with one geographic feature, and then attributed to a similar geographic feature as described in further detail below. As an example, the label can be of the form of a push-pin symbol or other marker on an online map that corresponds to (and is labeled with) the geographic feature. In some implementations, the determination of similarities among the different geographic features can be based on analyzing queries for multiple time periods, where the multiple time periods evaluated are the same for each geographic feature. For example, using the multiple time periods, trends can be determined for a particular geographic feature (e.g., queries for a product of interest in a West Coast high-tech city). The trends can be used, for example, to target ads or other content to similar geographic features. For example, an East Coast city can be determined to be similar to a West Coast city if, for example, users in both cities submit large number of queries for the same subject (e.g., nuclear physics). In this this example, the two cities may be similar because, over time, they have had similar patterns of excess queries, e.g., related to nuclear physics. In some implementations, the similarities can be measured over different time periods, e.g., separate time periods, offset in time, for each geographic feature.

Two features can be considered to be similar based for example on excess queries as described above. The physical location of the similar features can be measured by a distance or displacement. For example, the displacement can be characterized as a displacement in time, such as an amount of time required to travel from one feature to another. Accordingly, the two similar features can be characterized by a displacement in time, which defines an amount of time to traverse from one feature to the other. The means for traversal can be by any conventional means, such as by foot, car, train, plane, etc. Displacement in time can also refer to an amount of time that is required between the occurrence of events in or at the features, such as the amount of time for a weather system to progress from one feature to the other, the amount of time for a person to travel from one feature to another, or the amount of time for information to pass from one feature to another. Each of these is an example. Other ways of determining the displacement in time are possible. The significance of the determination of the displacement in time relates to a determination made by the system, for example, for the benefit of an advertiser, to be able to timely provide content at the second feature after a pre-defined delay (as defined by the time offset) after presentation at the same content at the first feature.

Figure 3A:
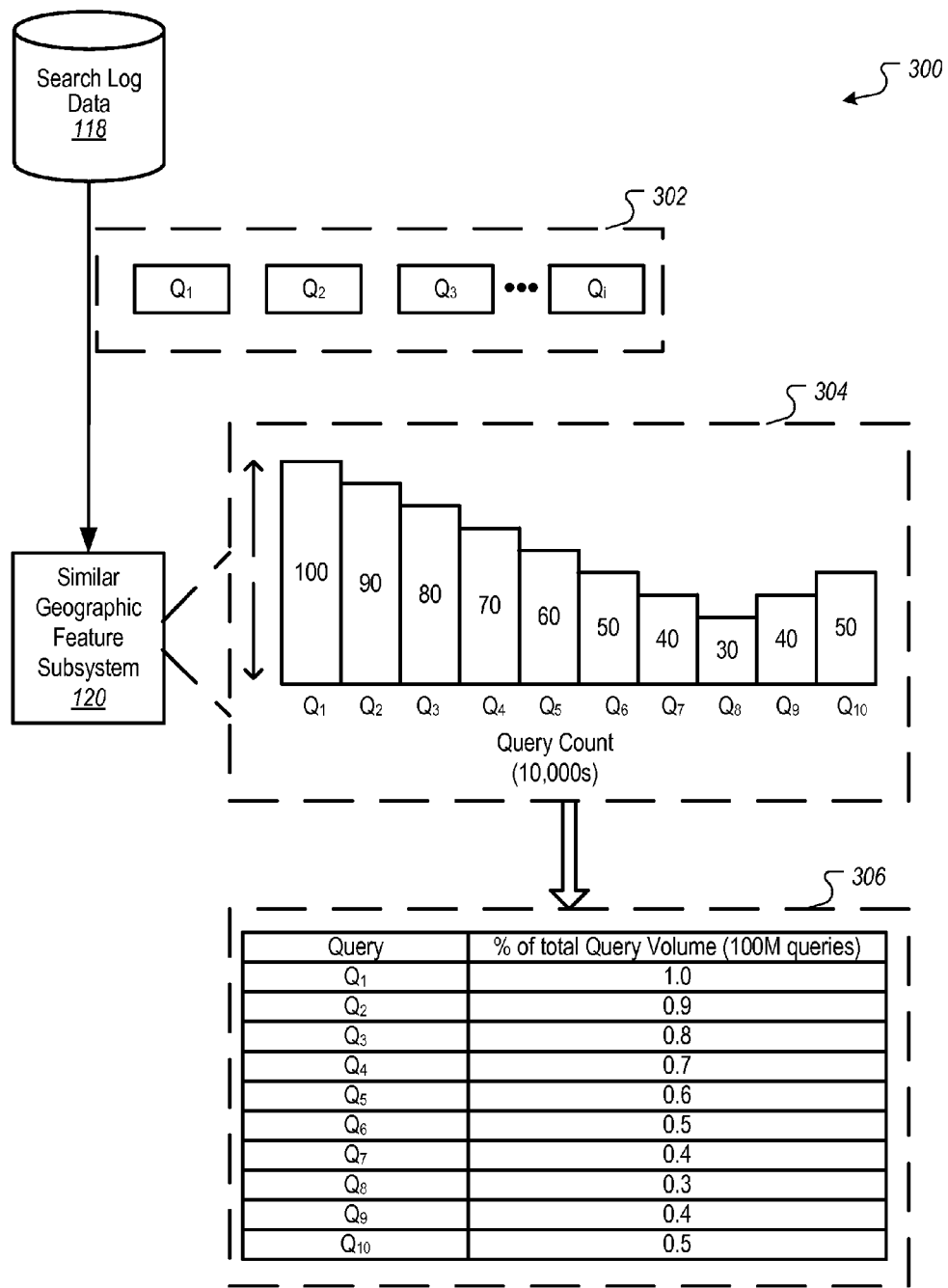
FIGS. 3A and 3B are block diagrams illustrating data flows corresponding to classification of search queries as excess queries.
Figure 3B:
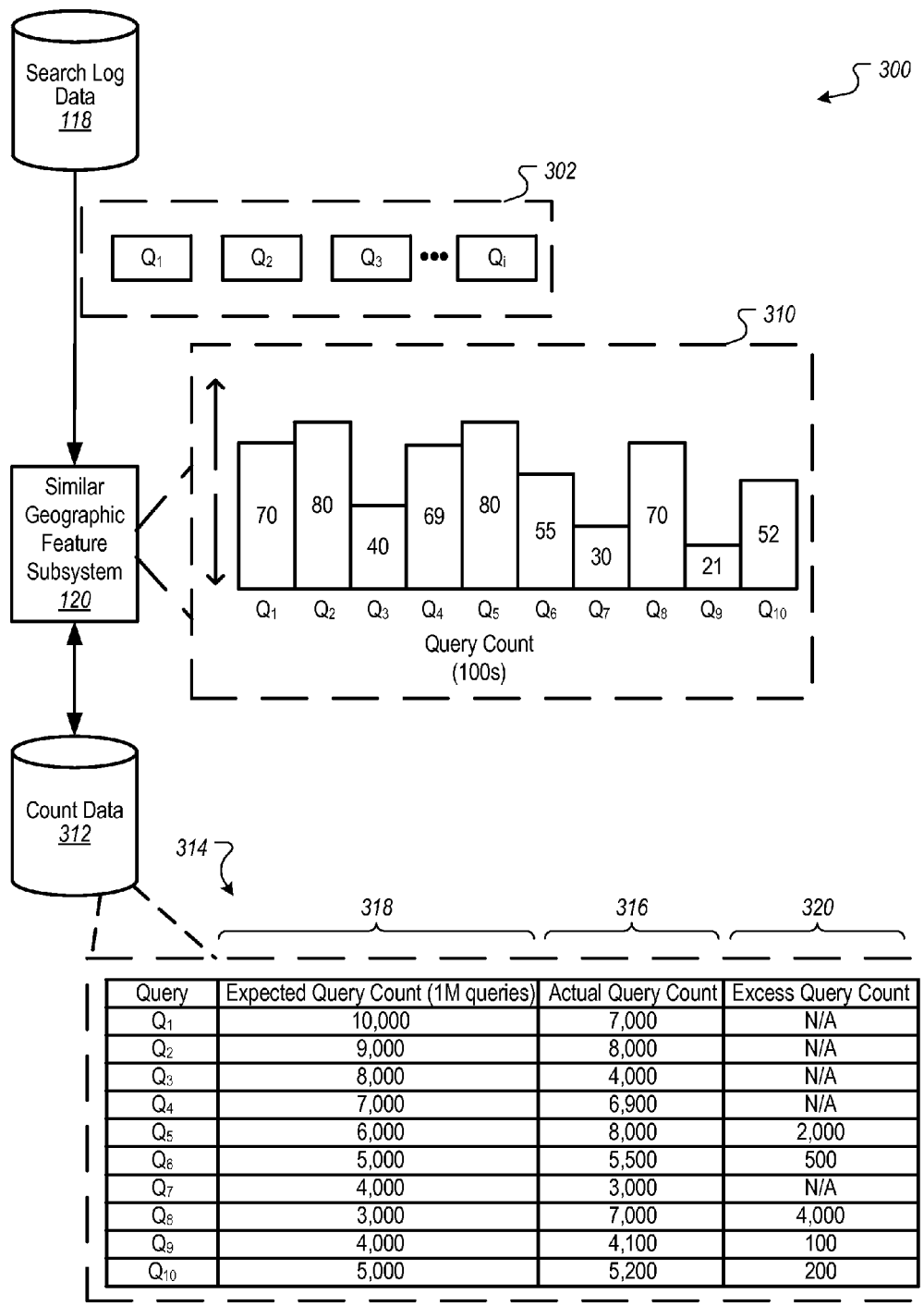

FIGS. 3A and 3B are block diagrams illustrating data flows 300 corresponding to the identification of excess queries. For example, using excess queries can be one way of determining that geographic features have similar queries, but offset in time. The similar geographic feature subsystem 120 receives search log data 302 from the search log data store 118. The search log data 302 includes queries ($Q_1$-$Q_j$) that were received from users, and data specifying the locations from which the queries were received. In some implementations, the search log data 302 can include all queries that were received from users in a baseline (or reference) geographic region. For example, the search log data 302 can include search queries that were received from all users within the continental United States. In some implementations, the search log data 302 can include only queries that were received from users at least a threshold or minimum number of times. For example, the queries included in the search log data 302 can include queries that were received at least a statistically relevant number of times (e.g., relative to a total number of queries received).

In some implementations, the search log data 302 received by the similar geographic feature subsystem 120 is a set of search queries that were received from users over a specified period. The specified period can be, for example, a specified amount of time or a specified number of events. The search log data 302 can include or specify search queries that were received from users over a previous calendar month (or other time period), or the past 100,000,000 search queries that have been received, to name a few examples.

The similar geographic feature subsystem 120 can analyze the search log data 302 to obtain a query landscape 304 for the search log data 302. A query landscape is a collection of queries and a corresponding number of times that each of the search queries was received from user devices. In some implementations, the query landscape 304 can be obtained using a subset of the search log data 302. For example, the query landscape 304 can be obtained by selecting a threshold number queries that were received more often than the remaining queries. For illustrative purposes only, 10 queries ($Q_1$ through $Q_{10}$) are selected and included in FIG. 3A; however, thousands or even millions of queries can be selected for the query landscape 304. Alternatively, the query landscape 304 can also include each query that was included in the search log data 302.

In the example shown, the query landscape 304 includes a reference to each of the ten queries and a corresponding number of times that each query was received from user devices over the specified period. For example, according to the query landscape 304, the query $Q_1$ was received 1,000,000 times over the specified period, while the query $Q_7$ was received 400,000 times over the specified period.

Using the query landscape 304, the similar geographic feature subsystem 120 can determine a set of query shares 306, including a query share for each of the queries ($Q_1$-$Q_{10}$) in the query landscape 304. A query share for a query is a measure of the query count for the query relative to the total number of queries that were received. For example, the total number of queries that are counted in the query shares can be each of the queries specified by the search log data as being received over a specified period. In some implementations, the query share for each of the queries ($Q_1$-$Q_{10}$) can be computed as a ratio of the query count relative to the total number of queries (i.e., Query Share=Query Count/Total Queries received over specified period). For example, the query share for the query $Q_1$ has been computed to be 1.0% (i.e., 1,000,000/100,000,000), and the query share for the query $Q_7$ has been computed to be 0.4% (i.e., 400,000/100,000,000). To give the query shares a concrete context, for example, the query $Q_1$ (e.g., for "football") can have a nationwide occurrence percentage of 1.0% relative to all nationwide queries (e.g., including queries for "football"). Similarly, the query $Q_7$ (e.g., for "pie") can have a nationwide percentage of 0.4% relative to all nationwide queries. The percentages are relative to queries that occur during the given time period. These percentages can be use used, for example, to categorize and compare cities based on football-related queries. For example, cities with pro football teams may have a higher than expected percentage of football-related queries (e.g., 1.5% or 2%) than cities where pro sports are not emphasized (e.g., Bismarck, N. Dak.) which may have a smaller percentage of football-related queries.

Referring now to FIG. 3B, the similar geographic feature subsystem 120 can also analyze the search query log 302 to identify search queries that were received from user devices located in a particular geographic region. As described above, each query can have a corresponding geographic identifier that specifies a location of the user device that submitted the query. The similar geographic feature subsystem 120 can use these geographic identifiers to filter the search query data 302 to select only queries that were received from user devices in a particular geographic region. In some implementations, location data can be associated with a query, and not necessarily be related to the location of the device that submitted the query. For example, the location data may reflect a location of interest (e.g., as specified in the query itself) and the queries related to that location may represent the queries that are most often provided when searching/seeking information about the location.

In some implementations, the corresponding geographic identifier for each query can correspond to, or specify, a latitude and a longitude representing the location (e.g., of the user device that submitted the search query). The geographic identifier can also be, for example, a ZIP code corresponding to the location (e.g., of the user device that submitted the query), a city described by the location, an area that is represented by the location and/or a specified distance from the location (e.g., a distance from a coordinate or city center), or some other geographic identifier.

A latitude and longitude for each query can be obtained based on user profile data provided by the user and/or an anonymized Internet Protocol (IP) address (e.g., a hash value computed using the IP address) corresponding to a user's device. When the user device is a mobile device (e.g., cell phone, Personal Data Assistant, smartphone, or other portable data communications device), the location of the user device can also be provided by location-based services (e.g., GPS) that have been enabled for the user device.

Using the geographic identifiers, the similar geographic feature subsystem 120 can determine a total number of queries that have been received from user devices in or queries associated with the particular geographic location. For example, the similar geographic feature subsystem 120 can compute a sum of all queries received from user devices located in the particular geographic region over the specified period. The similar geographic feature subsystem 120 can also determine, for each search query received over the specified period, a geo-query count. A geo-query count is a value that represents a total number of times that one or more queries were received from user devices in or associated with the particular geographic feature. The similar geographic feature subsystem 120 can compute, for the specified period, a total geo-query count that represents a total number of search queries that were received from user devices in or associated with the particular geographic feature.

The geo-query counts for the queries can be used to obtain a geo-query landscape 310 that is a collection of queries received for a particular geographic region and corresponding numbers of times that the queries were each received from user devices in or associated with the particular geographic feature over a given time period. For example, the geo-query landscape 310 specifies that the query $Q_1$ was received 7,000 times and that the query $Q_8$ was received 8,000 times, such as over the same 24-hour period. The geo-query landscape 310 can be stored, for example, in a count data store 312. The geo-query counts obtained from the geo-query landscape 310 can be indexed, for example, based on the queries to which they correspond. For example, the query $Q_1$ can be used to index information in the geo-query landscape 310 for the current geographic region or for similar data in the geo-query landscape 310 for other geographic regions. Further, the index for the query $Q_1$ can be used, for example, to look up geo-query landscape 310 information for multiple geographic regions, such as to compare geo-query counts for individual queries (e.g., queries ($Q_1$-$Q_{10}$)) across multiple geographic regions.

A table 314 lists the geo-query counts for the queries ($Q_1$-$Q_{10}$) in an actual query count column 316 titled "Actual Query Count." The values in the actual query count column 316 correspond to the geo-query count values in the geo-query landscape 310 for the current geographic region over the current time period. The actual query count values can be used for comparison with expected query counts for the same queries. In this example, excess query counts are computed as an absolute difference between the expected query counts and the actual counts. In some implementations, proportions can be used to indicate a relative ratio of query counts, e.g., ratio=actual_query_count/expected_query_count.

The similar geographic feature subsystem 120 can use the total geo-query count for a particular geographic feature to obtain an expected query count for each of the queries. In some implementations, the similar geographic feature subsystem 120 can obtain the expected query count for each query by multiplying the total geo-query count by the query share that was computed for the query (i.e., (expected query count)=(total geo-query count)*(query share)). For example, if the total geo-query count is 1,000,000, then the expected query count for the query $Q_1$ is computed to be 10,000 (i.e., 10,000=1,000,000*0.01). Similarly, the expected query count for the query $Q_8$ is computed to be 7,000 (i.e., 7,000=1,000,000*0.007). To give the expected query count a concrete context, the queries $Q_1$ and $Q_8$ are expected to occur 10,000 and 7,000 times, respectively, within the given time period for the geographic feature. The expected query counts for the queries can be stored, for example, in the count data store 312 and indexed based on the query to which each of the expected query counts correspond. For example, the table 314 lists the expected query counts for the queries ($Q_1$-$Q_{10}$) in an expected query count column 318 titled "Expected Query Count."

The similar geographic feature subsystem 120 compares the geo-query counts for each of the queries to the corresponding expected query count for each query to determine whether the geo-query count for the query exceeds the expected query count. Referring to FIG. 3B, for example, the similar geographic feature subsystem 120 can compare values in the actual query count column 316 to values in the expected query count column 318 to determine values in an excess query count column 320. For example, comparing the geo-query counts to the expected query counts reveals that the geo-query counts for the queries $Q_1$-$Q_4$ and $Q_7$ fail to exceed the corresponding expected query counts for these queries, thus resulting in "N/A" entries in the excess query count column 320 for those queries. However, the comparisons also reveal that the geo-query counts for the queries $Q_5$, $Q_6$, and $Q_8$-$Q_{10}$ do exceed the corresponding expected query counts for these queries. Namely, the queries $Q_5$, $Q_6$, and $Q_8$-$Q_{10}$ from the particular geographic feature were submitted in excess of what is expected. As a result, the entries in the excess query count column 320 for those queries are positive values. The values in the excess query count column 320 represent the difference between actual and expected query counts, from columns 316 and 318, respectively. Specifically, the excess query count for the query $Q_5$ is 2000 (e.g., 8000-6000), and so on. Thus, these queries may be locally significant queries for the particular geographic feature, and may qualify to be classified as local queries.

In some implementations, the similar geographic feature subsystem 120 can classify, as a local query, any query having a geo-query count that exceeds the corresponding expected query count. In some implementations, the similar geographic feature subsystem 120 can require that a local query be a query for which the geo-query count exceeds the corresponding expected query count by at least a threshold amount.

For example, the similar geographic feature subsystem 120 can require that the geo-query count exceeds the expected query count by a specified percentage (e.g., 20%) or by an absolute number (e.g., 1,000). The similar geographic feature subsystem 120 can also require that each query that is classified as a local query be one of N queries (e.g., 10, 100 or 1,000 queries) having geo-query counts that exceed the corresponding expected query counts by the highest amount. Assuming that the similar geographic feature subsystem 120 requires local queries to have a geo-query count that exceeds the expected query count by at least 40%, the queries $Q_5$ and $Q_8$ would qualify to be classified as local queries for the particular geographic feature.

As described above, search queries can be received from a number of different user devices (e.g., desktop personal computers or mobile devices). However, users that submit queries from a mobile device are generally more likely to be searching for local search results than users that submit queries from a desktop computing device. Therefore, the query landscapes for queries submitted using mobile devices can be substantially different than the query landscapes for queries submitted using other devices.

In some implementations, one or more query landscapes can be generated using search queries that were received from mobile user devices (e.g., cell phones), and one or more separate query landscapes can be generated using search queries that were received from other user devices (e.g., personal computers) or queries that are attributed to particular locations. In other words, the query landscapes can be partitioned according to the different types of devices that were used to submit the queries or ways that a location is associated with a given query. In some implementations, separate query shares (e.g., a mobile device query share and a query share for other non-mobile devices) can be generated using the separate query landscapes. In turn, separate expected query counts (e.g., a mobile expected query count and an expected query count for other, non-mobile devices) can be computed using the separate query shares and the total geo-query count for the particular geographic region. Once the separate expected query counts have been computed, a particular search query can be classified as a local and/or non-local query using the separate expected query counts.

For example, if the particular search query has been received from non-mobile user devices located in the particular geographic region, and the particular search query has an actual query count that is more than the expected non-mobile query count, then the particular search query can be classified as a local query for non-mobile devices. However, if the particular search query has been received from mobile user devices located in the particular geographic region, and the particular search query has an actual query count that is less than the expected mobile query count, then the particular search query will not be classified as a local query for mobile devices, in some implementations.

The similar geographic feature subsystem 120 can use the non-zero entries in the excess query count column 320 in comparisons with similar data for other geographic features (e.g., other cities) to determine similar geographic features. For example, similar excess query count data can exist for other cities for the same queries (e.g., $Q_5$, $Q_6$, and $Q_8$-$Q_{10}$). Further, other cities, for example, may have excess queries for other queries in the set of queries $Q_1$-$Q_{10}$, namely any of the queries $Q_1$-$Q_4$ and $Q_7$ which had no excess queries in the current example. Moreover, multiple time periods can be used, for example, for comparing excess query counts for multiple geographic features over multiple time periods. By comparing the queries for different geographic features (e.g., cities) in this way, the similar geographic feature subsystem 120 can, for example, identify similar geographic features, each of which having potentially related sets of excess queries over time. Doing so can result in a determination that one or more similar geographic features exist for a given geographic feature. As an example, the similar geographic feature subsystem 120 can determine that, for a city such as San Francisco, other cities such as Fresno, Calif. are similar, where the similarity exists because users in both cities generate similar local or geographically-based queries, as determined from excess query counts over time.

FIG. 4 is a block diagram illustrating relationships among excess query counts for different geographic features over multiple time periods. For example, the similar geographic feature subsystem 120 can determine the excess query counts as described above with reference to FIGS. 3A and 3B. However, the type of information shown in FIG. 4, particularly regarding numbers of query counts for different geographic features over multiple time periods, can be indicative of results from other processes and methods (e.g., not using excess queries) for determining that geographic features have similar queries, but offset in time. In the example shown in FIG. 4, the excess query counts are divided into three separate data tables 402a, 402b and 402c that correspond to Cities A, B and C, respectively. Each of the data tables 402a, 402b, 402c includes columns of excess query counts that correspond to multiple time periods 404a-404d. The values listed for City A's excess query counts in the first time period 404a, for example, correspond to the values in the excess query count column 320 from the table 314 (see FIG. 3B). The process described above in reference to FIGS. 3A and 3B can be repeated to compute the excess query counts for the other three time periods 404b-404d identified in City A's data table 402a. The process can also be used to determine the excess query counts for City B's data table 402b and City C's data table 402c, for all four time periods 404a-404d. The three cities, four time periods and ten queries used in FIG. 4 represent just a small sample of a universe of excess query counts that can be determined. For example, many thousands of cities (or other geographic features) can be used, as well as many hundreds or thousands of time periods, and potentially millions of queries.

In some implementations, the similar geographic feature subsystem 120 can analyze the rate of growth in the queries, e.g., from a period N relative to an earlier period N−1. For example, the rate of growth can be computed as queries (period (N))/queries(period(N−1)). In some implementations, the rates of growth can be normalized (e.g., by dividing the rates of growth by the total number of queries from that region). In this way, regions having different populations can be compared.

In some implementations, query count information in the data tables 402a, 402b and 402c can be used to determine relationships, including predictive relationships, across pairs or sets of geographic features (e.g., cities) that are offset in time. That is, the query count information can be evaluated to determine not only similarity, but also an offset (e.g., in time) describing the similarity. Further, the predictive relationships can be used to target and serve content.

In some implementations, the similar geographic feature subsystem 120 can store the excess query counts for each geographic feature (e.g., each city) in multi-dimensional (e.g., two-dimensional or greater) arrays. For example, referring to FIG. 4, the data tables 402a, 402b, 402c show storage of the excess query counts the Cities A, B and C as arrays with a query-based dimension (e.g., the queries $Q_1$-$Q_{10}$) and a time-based dimension (e.g., the time periods 404a-404d). Other dimensions and storage methods can be used for the storage of the excess query counts, such as using three dimensions, where the dimensions are queries, time periods, and geographic features. In some implementations, indexes can be used for any or all of the dimensions, such as for more efficient retrieval of information for data analyses.

In some implementations, other dimensions can be implied or modeled, such as dimensions that model groups of excess queries over time. For example, a fourth dimension can relate City A's excess query counts over a set of sequential time periods to City B's excess query counts over a set of sequential time periods, where the time periods can be offset in time.

In some implementations, the multiple time periods used for counting and analyzing excess queries, such as the time periods 404a-404d, can be separated in time by one or more intervals. In this way, for example, the time periods 404a-404d can represent samplings of queries over time, such as at discreet time periods. For example, the time period 404a can be an hour-long time period (or a longer time period) that is separated by several hours (or days, weeks, etc.) from any other time periods, including the time periods 404b-404d. In some implementations, the similar geographic feature subsystem 120, for example, can select time periods that provide a sufficiently representative number of queries for analysis. For example, for the query Yosemite, time periods can be selected that contain hundreds or thousands or more queries, as opposed to shorter time periods that include only a few queries, which may not lead to useful analyses of the excess query counts. Similar cities can be determined from the excess query counts shown in FIG. 4, e.g., the Cities A and B having excess query counts listed in data tables 402a and 402b, respectively. Specifically, a similarity exists between the two Cities A and B for the queries $Q_5$ and $Q_8$ for all four time periods. For example, the City A data table 402a includes, for the query $Q_5$, excess query counts of 2000, 4000, 6000 and 2000 over the four time periods 404a-404d. Similarly, the City B data table 402b includes, for the same query $Q_5$, excess query counts of 1000, 1100, 2200 and 4300. While City B's values are not equal to the values for City A, they have been determined by the similar geographic feature subsystem 120 to represent similar excess queries. This is because the values are relatively large, e.g., in the thousands.

Some implementations can compute and store excess query count values (e.g., in the data table 402a-402c) as relative values, e.g., percentages of expected counts. As a result, while City B's excess query count values are lower in an absolute sense, they may in fact represent relatively the same or a larger percentage relative to their corresponding expected query counts. For example, each the query $Q_5$ excess query counts for Cities A and B, when treated as a percentage of expected counts, may be 20% or greater, indicating that Cities A and B are similar cities, at least when taking the query $Q_5$ into account.

Geographic features that have few (e.g., less than a predetermined threshold) or only one common excess query may not necessarily be determined to be similar. Other similarities in the excess query counts may also need to exist. For example, referring to the data tables 402a and 402b in FIG. 4, similar excess query counts for Cities A and B can also be determined to exist also for the query $Q_8$ over all four time periods 404a-404d. The commonality for the query $Q_8$ and other queries over several time periods 404a-404d can be sufficient for the similar geographic feature subsystem 120 to make a conclusion 406 that City B is a similar geographic feature to City A. For example, the conclusion can be based at least in part on the values in the data tables 402a and 402b for the queries $Q_5$ and $Q_8$ over all four time periods 404a-404d.

In some implementations, comparing geographic features for similarity can include determining a similarity threshold equal to a minimum number of excess queries that must be shared between two geographic features in order to find similarity. For example, in order for the similar geographic feature subsystem 120 to determine that San Francisco and Boston are geographically similar, a pre-determined minimum number of excess queries (e.g., five, ten, 100, etc.) must be shared, not just two (e.g., the queries $Q_5$ and $Q_8$). Specifically, San Francisco and Boston, to be considered similar geographic features, must share a number of excess queries that is greater than the similarity threshold (e.g., five, ten, 100, etc.). In some implementations, similarity can also be determined using a weighted measure of the shared excess scores. For example, if San Francisco had 400 excess terms with excess percentages ranging from 1% to 20%, and Boston had 200 excess terms with excess percentages in the same range, then the determination of whether or not San Francisco and Boston are similar can be based on the pure overlap in these excess lists, as described above (e.g., 100 shared excess queries). In some implementations similarity can be based on an average percentage of shared excess queries (e.g., (100/200+100/300)/2=41.7% shared excess). In some implementations similarity can be based on a weighted percentage. For example, if all the shared excess queries were at 20% excess for both locations, and if all non-overlapping excess queries were at 1% excess in both locations, then the weighted excess measure would be (100*0.2/(100*0.2+100*0.01)+100/(100*0.2+200*0.01))/2=93%.

In some implementations, the similar geographic feature subsystem 120 can also consider dissimilar, or mismatched, excess queries when determining whether a candidate geographic feature (e.g., Jackson, Miss.) is a similar geographic feature to the target geographic feature (e.g., San Francisco). A dissimilar excess query can be (or be represented by), for example, a significantly large excess query for the target geographic feature and a zero or insignificant excess query for the candidate geographic feature. For example, referring to FIG. 4, City C's data table 402c (e.g., which can represent Jackson, Miss.) includes excess query counts in the thousands for the queries $Q_1$, $Q_3$ and $Q_6$. These values are dissimilar to the values in City A's data table 402a (e.g., San Francisco), which has zero or null values for queries $Q_1$ and $Q_3$, and values in the low hundreds for the query $Q_6$. The similar geographic feature subsystem 120, for example, can use these dissimilarities to determine that City A (e.g., San Francisco) is dissimilar to City C (e.g., Jackson, Miss.). This determination can be made by considering the dissimilarities for the queries $Q_1$, $Q_3$ and $Q_6$, in combination, in spite of a single shared set of excess query counts for the query $Q_8$.

In some implementations, when dissimilar excess queries are used in determining whether geographic features are similar, one or more dissimilarity thresholds can be used. For example, one type of dissimilarity threshold can specify that a certain number of dissimilar excess query counts (e.g., ten or more) can result in determining that the geographic features are not similar, regardless of excess query counts. In another example, a different type of dissimilarity threshold can specify that a certain percentage of dissimilar excess query counts (e.g., 50% or more) relative to similar excess query counts can result in determining that the geographic features are not similar. For example, even if N similar excess query counts are shared between geographic features, if N/2 dissimilar excess query counts also exist, then the similar geographic feature subsystem 120 can determine that the geographic features are not similar. In either example, if the dissimilarity thresholds are not met, then the geographic features can be determined to be similar.

In some implementations, instead of (or in addition to) analyzing excess queries, the similar geographic feature subsystem 120 can analyze queries counts that occur below the expected counts for geographic regions. In some implementations, deficiency scores can be computed using absolute counts (e.g., the number of query counts that are below the expected counts) or relative counts (the percentage by which the query counts are below the expected counts). In some implementations, deficiency scores can be represented as negative numbers which, for example, can be used to offset similarities of geographic features based on similar excess queries.

Some implementations can consider the quality of the excess queries shared by a target geographic feature and a candidate geographic feature. For example, a higher quality of the excess queries shared between two or more geographic features can increase the likelihood that the geographic features will be determined to be similar. In some implementations, one measure of quality can be the query volume associated with excess queries. Example volume measurements can include an absolute number (e.g., the difference between a geo-query count and the corresponding expected query count) and a relative number (e.g., the percentage by which a geo-query count exceeds the corresponding expected query count). For example, a particular excess query in which the geo-query count exceeds its corresponding expected query count, e.g., by 300%, can be said to have a higher quality than a second excess query in which the geo-query count exceeds its corresponding expected query count by just 20%. In some implementations, other measures of quality can be used in addition to the query volume, and qualities can be summed or averaged over a set of excess queries that are shared. In some implementations, the presence of higher-quality similar excess queries between two geographic features can offset, at least in part, dissimilar excess queries.

In some implementations, other aspects relating to the quality of excess queries can be used. For example, a query's rarity compared to other queries can be analyzed, e.g., a very rare query (e.g., "geothermal activity") can be given a higher weight than common queries in a geographic area. In some implementations, misspelled queries can be removed from the potential set of very rare queries. In some implementations, query language can be analyzed, and weights can be used, e.g., for ad campaigns that target different nationalities.

In some implementations, click-through rates can be analyzed for the terms associated with excess queries. For example, excess queries having terms that historically have led to higher click-through rates can be weighted higher than other excess queries.

In some implementations, one of the reasons for determining similar geographic features can be to serve content (e.g., ads) to one or more of the similar geographic features based on those features' similarities to one or more other features. For example, an ad campaign that has been targeted to a city on the West Coast (e.g., San Francisco) may be very successful, e.g., leading to significant numbers of impressions, clicks and conversions. In light of the successful campaign, advertisers may want to target the same or similar content (e.g., ads) to other similar cities. For example, if an ad campaign related to high-tech medical products is successful in the San Francisco area, e.g., based on user reactions to ads in the campaign, then the advertisers may want to run the same ad campaign in the geographically-similar Boston area. San Francisco and Boston may be determined to be similar geographic features (e.g., cities), for example, based on analysis performed by the similar geographic feature subsystem 120.

In another example, users in the San Francisco area may submit a higher than average number of queries for Yosemite, as determined by excess query counts for queries that include Yosemite as a search term. In an effort to reach a higher population of users interested in Yosemite, publishers and advertisers can target Yosemite-related content, including ads, to users in geographic features (e.g., other cities) that are similar to the San Francisco area. The targeting to similar cities can include, for example, Yosemite-related ads (e.g., hotels and activities in the Yosemite area) and content. In the case of targeting content, for example, Yosemite-related content can be ranked higher in a user's set of search results. In the case of targeting ads, for example, the relevancy of an ad can be boosted, increasing the probability that a Yosemite-related ad is selected for an ad impression.

Referring again to FIG. 4, a query count pattern 408a for City A is shown that matches a similar query count pattern 408b for City B, e.g., based on similar query counts. For example, City B can be a geographic feature which, in addition to being identified as a similar geographic feature to City A, is also identified as a geographic feature that includes similar excess queries, but displaced in time. Specifically, while the similar excess queries for the queries $Q_5$ and $Q_8$ for Cities A and B can lead to a determination that cities are similar geographic features, the query count patterns 408a and 410a indicate that the excess queries are also displaced in time. Regarding City A, for example, for the excess query $Q_5$ in the time period "1" 404a, the query count is 2000. In the next time period "2" 404b, the query count is double that amount (e.g., 4000). In the third time period "3" 404c, the query count is triple (e.g., 6000) that of the query count for the time period "1" 404a. Then, in the fourth and last time period "4" 404d, the query count (e.g., 2000) is equal again to the time period "1" 404a query count. In this example, the query counts represent a proportional pattern that is 1:2:3:1 (e.g., 2000:4000:6000:2000) for the time periods 404a-404d. Now, regarding City B's query counts over the same time periods 404a-404d, the query counts of 1000, 1100, 2200 and 4300 generally represent a proportional pattern of 1:1:2:3. In this example, the last three-fourths portion of City B's 1:1:2:3 pattern (e.g., 1:2:3) matches the first three-fourths portion of City A's pattern. As a result, City B can be said to have a time offset relative to City A, regarding excess queries.

Referring to query counts for the query $Q_8$ in FIG. 4, the query count patterns 410a and 410b for Cities A and B, respectively, also indicate similar excess queries, but displaced in time. For example, the query counts 4000, 8000 and 16,000 for City A over the time periods 404a-404c, respectively, are in a proportional pattern of 1:2:4. Similarly, the query counts 2200, 4200 and 8300 for City B over the time periods 404b-404d are generally in a proportional pattern of 1:2:4. This is another example of groups of similar excess queries, offset in time.

In some implementations, instead of using proportions of query counts, actual query counts can be used to determine groups of query counts that are similar between geographic features, but offset in time. For example, instead of finding City B as similar city to City A (e.g., based on query count patterns 408a and 408b), a city with actual query counts closest to City A (e.g., 2000, 4000, 6000 and 2000) but offset in time, can be selected as the best candidate similar city.

Patterns such as the query count patterns 408a and 408b can be determined automatically using various mathematical and statistical processes to find the best predictive relationships across pairs or sets of geographic features (e.g., cities). In some implementations, for each city processed, all the queries for a given time can be compared to all the other cities for a time that is a delta time later. For example, consider the processing to find the best predictive city that is similar to City A for the time periods 404a-404c (e.g., day-long time periods), where the delta time is one day. City A's query counts for those three time periods 404a-404c can be compared to the other cities' (e.g., City B's, City C's, etc.) time periods that are offset by the delta time, or one day later. As a result, City A's query counts for time periods 404a-404c can be compared to all the other cities' query counts for the time periods 404b-404d. Other delta times can be used that can represent more than a single-column time shift in the use of query counts from the time periods 404a-404d. For example, if using one delta time (e.g., one day) does not find similar features, then a different delta time (e.g., two days) can be used, and so on, as needed.

In some implementations, comparing multiple sets of queries can be done using any or all of: 1) a cosine similarity; 2) an absolute difference; or 3) or sum-square differences, computed between each city. For example, the process can iterate over different time lags, such as different delta times (e.g., one day, then two days; or six hours, then nine hours, etc.). The minimum time lag set can correspond to the shortest useful prediction period for deploying ad campaigns. For example, it can be determined that the cities and time lags with the smallest differences (or largest cosine similarity) can be the best predictive cities and lag times.

In some implementations, determining a minimum useful prediction period can depend, for example, on the advertising media that will be used to serve ads based on predicting similar geographic features. For example, print ads can require a much longer lead time than radio ads, which in turn can require a much longer lead time than Internet-based ads. When setting the delta time(s) by which query counts of geographic features are compared, for example, a different time range can be selected that is suitable for each type of campaign and/or each type of media. This can allow the same similarity matrices (e.g., the data tables 402a-402c) to be used for different advertising media types.

This comparison process can be repeated for each geographic feature to determine each geographic feature's best predictive set of geographic features. For example, the same sort of analysis of excess queries that identified City A as a predictive geographic feature for City B can be used to find other cities that are similar to City A. In this case, the process is can be used to find candidate geographic features (e.g., City B) to which to serve content (e.g., ads) using a target geographic feature (e.g., City A) as a basis.

Once a candidate geographic feature is determined relative to a target geographic feature, content can be served to the candidate geographic feature. For example, once City B is determined to lag behind City A by a given offset, then ads or other content that have performed well in City A can be served to users in City B after the offset has expired. Similarly, the same ads or other content can be served to other geographic features (e.g., other cities) that also are similar to City A. The content can be served, for example, using a time offset that represents the lag time between the similar excess queries of the two cities.

The description that follows describes methods that can be performed to facilitate identification of excess queries for multiple geographic features, and to use the excess queries to identify, and serve content to, similar geographic features. These processes can be performed on any number of queries and geographic features, as well as the time periods over which the queries were received from users associated with the geographic features.

Figure 5:
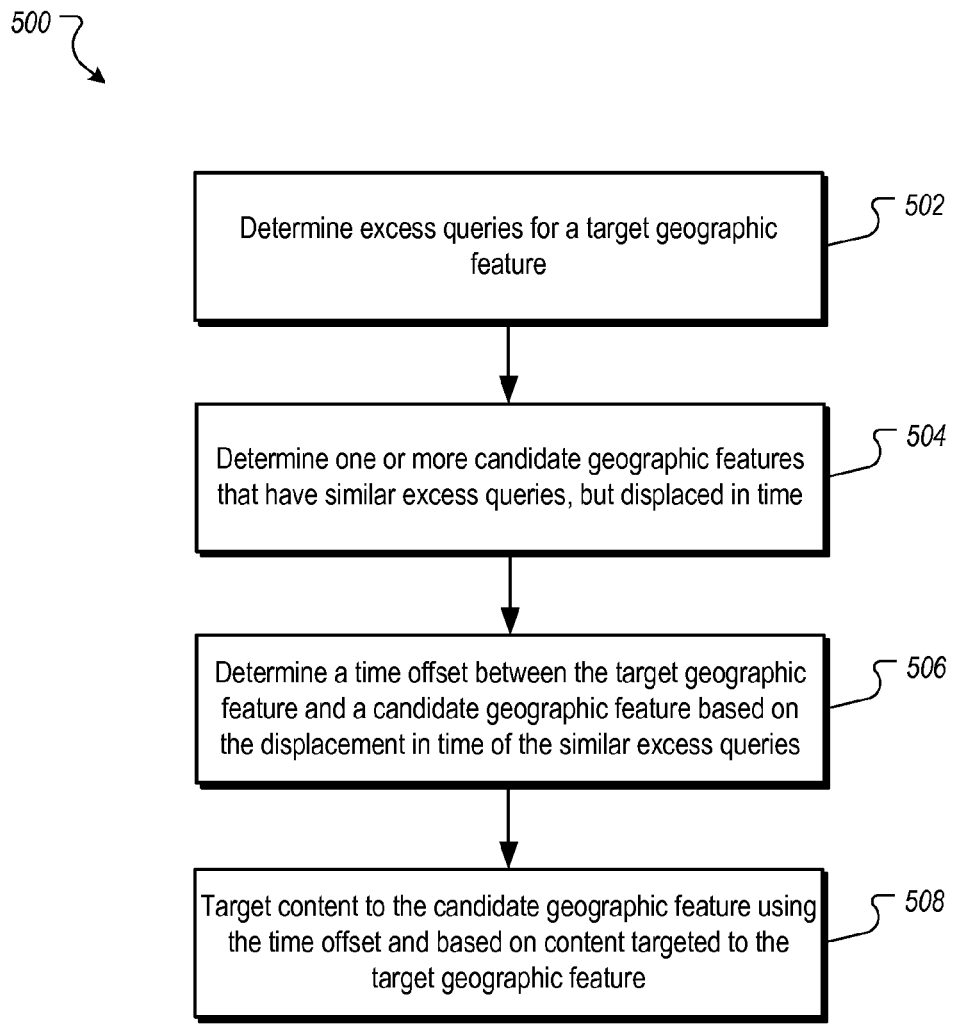
FIG. 5 is a flow chart of an example process for targeting content based on similar excess queries with a time offset for similar geographic features.

FIG. 5 is a flow chart of an example process 500 for targeting content based on similar excess queries with a time offset for similar geographic features. The process 500 can be used to target content, such as ads, to one or more candidate geographic features for a given target geographic feature. The target geographic feature, for example, can be a city to which content has been served. The candidate geographic features, for example, can be other cities that can be chosen for which to serve content, where the content served is based on similar geographic features. The other cities can be identified, for example, because they have excess queries that are similar to the target geographic feature's excess queries, offset in time. By targeting additional cities in this way, ad campaigns can be more successful because the users in the targeted cities (i.e., the candidate geographic features) can be more likely to be interested in the ads.

The process 500 can be implemented, for example, by the similar geographic feature subsystem 120 and/or the search system 110 of FIG. 1. In some implementations, the similar geographic feature subsystem 120 is a data processing apparatus that includes one or more processors that are configured to perform actions of the process 500. In other implementations, a computer readable medium can include instructions that, when executed by a computer, cause the computer to perform actions of the process 500.

Excess queries for a target geographic feature are determined (502). For example, the similar geographic feature subsystem 120 can determine excess queries for multiple geographic features. Referring to FIGS. 3A and 3B, for example, the similar geographic feature subsystem 120 can determine excess queries for the Cities A, B and C. Specifically, the queries $Q_5$ and $Q_8$ for the Cities A and B, having excess query counts in the thousands, can be designated as excess queries. The excess queries for the Cities A, B and C can include queries for which positive excess query count values exist for the excess query counts in the data tables 402a-402c. FIGS. 3A and 3B show the data for just three cities, but excess queries can be determined for thousands or more other geographic features, including cities that are in addition to Cities A, B and C.

One or more candidate geographic features having similar excess queries, but displaced in time, are determined (504). For example, the similar geographic feature subsystem 120 can determine that the geographic features, Cities A and B, have similar excess queries, displaced in time. Referring to FIG. 4, for example, the query count patterns 408a and 408b that encompass similar triplet (e.g., 3-value) groups of excess query counts show a similarity between the geographic features City A and City B, at least with respect to the query $Q_5$. The same is true for the query $Q_8$, as the query count patterns 410a and 410b encompass similar triplet groups of excess query counts, indicating a similarity between the geographic features City A and City B with respect to the query $Q_8$. In some implementations, determining whether geographic features are similar can include examining the quality of clusters of query terms (e.g., clustered according to semantics or meaning) and comparing clusters' weights across cities, for example.

Clustering query terms can be accomplished in various ways. For example, query terms can be clustered based on how often they occur in the same time period by the same user (e.g., a user who searched on "BMW" then "series-5" in the same five-minute period). In another example, query terms can be clustered based on a thesaurus, e.g., words having the same meaning. In another example, query terms can be clustered based on how often they occur on the same web page (e.g., with other query terms).

A time offset between the target geographic feature and a candidate geographic feature is determined based on the displacement in time of the similar excess queries (506). For example, referring to FIG. 4, if the time periods 404a-404d represent adjacent one-hour time periods, then the time offset (or time displacement) between the target geographic feature (e.g., City A) and the candidate geographic feature (e.g., City B) is one hour. In some implementations, such as when the time periods are separated by one or more intervals, the time offset determined can be based on the difference between the start times of the time periods (e.g., time periods 404a and 404b) for which the excess queries are considered similar.

Content is targeted to the candidate geographic feature using the time offset and based on content targeted to the target geographic feature (508). As example, the same ad or ads (e.g., ads in an ad campaign) that are served to users in City A can be served to users in City B. The timing by which the ads are served can be based on the determined time offset. For example, if the time offset is two days, then ads that perform well in City A on Monday can be served to users in City C on Wednesday.

In some implementations, information associated with one geographic feature is attributed to a similar geographic feature, and the attributed information is used to target content to the similar geographic feature. For example, information may exist for City A that users in City A have a high interest in college football. Based on the shared excess queries between Cities A and B, e.g., queries that are unrelated to college football, content (e.g., ads) related to college football can be served to users in City B. In some implementations, the information associated with the one geographic feature can be targeting information. In some implementations, the information associated with the one geographic feature can be a label associated with the one geographic feature. For example, the label can be one or more keywords that can be used to target and select ads.

Figure 6:
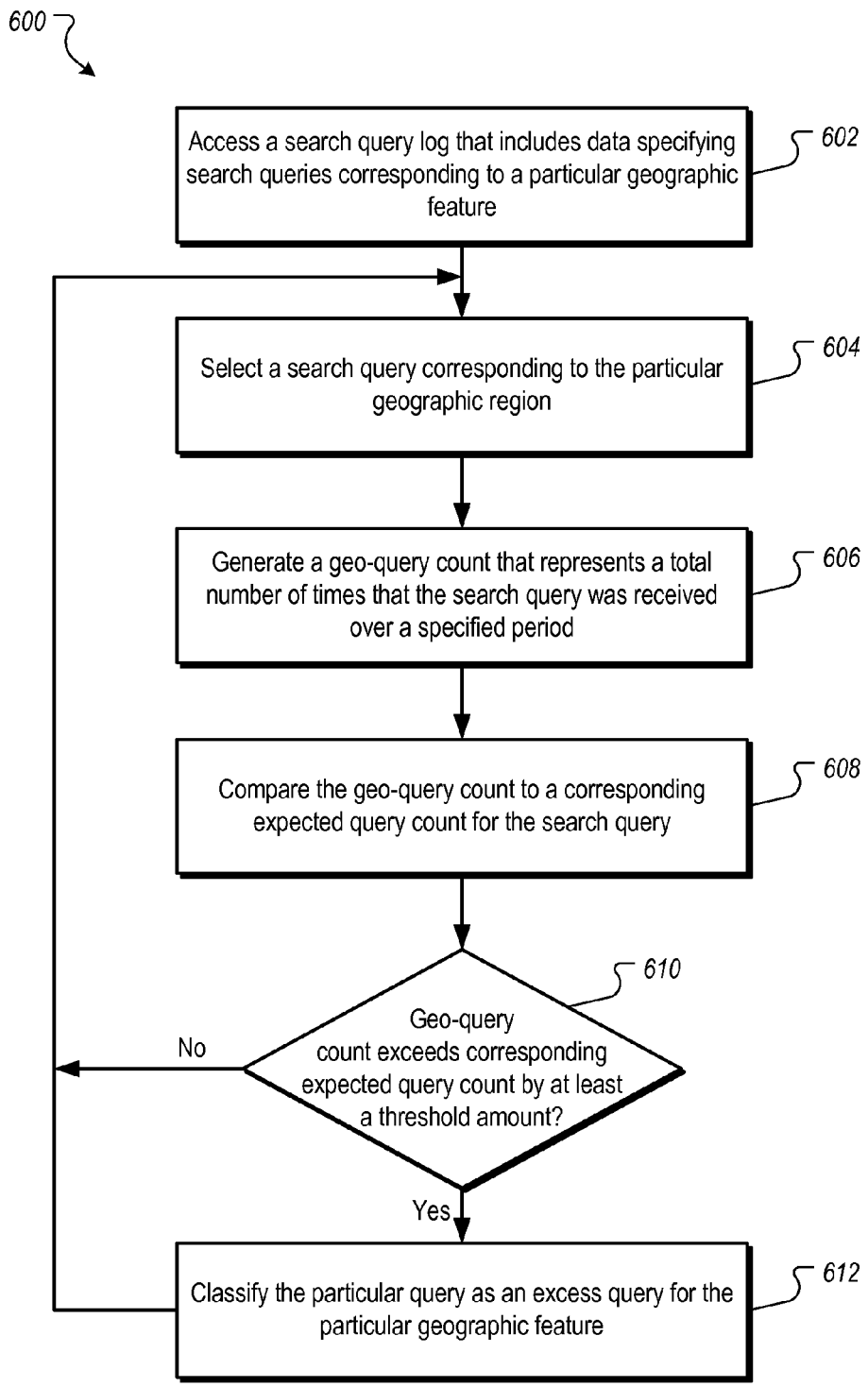
FIG. 6 is a flow chart of an example process for determining excess queries.

FIG. 6 is a flow chart of an example process 600 for identifying excess queries. The process 600 can be implemented, for example, by the similar geographic feature subsystem 120 and/or the search system 110 of FIG. 1. For example, the process 600 can be used to determine the excess queries that are identified in the data tables 402a-402c.

A search query log that includes data specifying search queries corresponding to a particular geographic feature is accessed (602). The geographic feature defines a location. As an example, the similar geographic feature subsystem 120 can access information for search queries for a particular geographic feature (e.g., San Francisco). The information for the search queries can be obtained, for example, from the search log data store 118.

In some implementations, the search log data store 118 can include the queries that have been identified as queries that were received from user devices located in the particular geographic region or queries that are associated with a given geographic region. In some implementations, the search log data store 118 can include search queries that have been received from or relate to many different geographic regions. In some implementations, the search log data store 118 can be filtered to select the search queries that are identified as queries received from a user device in or related to the particular geographic region.

For example, as described above, each search query can have a geographic identifier appended to or otherwise associated with it, where the geographic identifier represents a location of the user device that submitted the search query. In some implementations, search queries for a particular geographic region can be selected by filtering the search query log to remove search queries that do not have the geographic identifier representing the particular region. Thus, the search queries that remain in the filtered search query log will each correspond to the particular region.

A search query corresponding to the particular geographic region is selected (604). For example, referring to FIG. 3A, the similar geographic feature subsystem 120 can select one of the queries ($Q_1$-$Q_i$) (e.g., the query $Q_1$) from the search log data 302.

A geo-query count is generated that represents a total number of times that the search query was received over a specified period (606). As described above, the geo-query count for a search query represents a total number of times that the search query was received from the current geographic feature (e.g., San Francisco), for example, over a specified period (e.g., one or more hours, days, weeks, etc.). For example, the similar geographic feature subsystem 120 can compute the geo-query count based on a number of instances of the search query in the search query log 302 that have the geographic identifier corresponding to the particular geographic region (e.g., San Francisco). Referring to FIG. 3B, for example, the similar geographic feature subsystem 120 can store the geo-query count in the actual query count column 316. For example, the geo-query count for the query $Q_1$, as shown in the actual query count column 316, is 7,000.

In some implementations, the geo-query count can also be obtained from the search query log 302. For example, the search query log 302 can include a reference to the search query and a value representing a number of times that the search query was received from user devices in the specified geographic region and/or other geographic regions.

The geo-query count is compared to a corresponding expected query count for the search query (608). For example, the similar geographic feature subsystem 120 can compare the geo-query count for the query $Q_1$, (e.g., 7,000, as shown in the actual query count column 316) to the expected query count for the same query $Q_1$, (e.g., 10,000, as shown in the expected query count column 318).

In some implementations, the expected query count is a baseline number of times that the query is expected to be received, over the specified period, from user devices located in the specified geographic region (e.g., the San Francisco area). As described above, the expected query count for a query can be computed based on a query share for the query and a total number of queries that were received, over the specified period, from user devices located in (or corresponding to) the specified geographic region.

A determination is made whether the geo-query count exceeds the corresponding expected query count by at least a threshold amount (610). For example, the similar geographic feature subsystem 120 can determine whether the geo-query count (e.g., 7,000) for the query $Q_1$ exceeds the expected query count (e.g., 10,000) for the same query $Q_1$. If geo-query count does not exceed the corresponding expected query count by at least a threshold amount (e.g., 1000), then the next search query is selected (604). In some implementations, thresholds can be based on ratios, e.g., the ratio of actual query counts to expected query counts. As a result, an example threshold by which to determine whether a query exceeds the expected query count can be 20% or some other percentage.

In response to a positive determination, the particular search query is classified as an excess query for the particular location (612). In some implementations, classifying the search query as an excess query for the particular geographic feature includes storage of the excess query count and/or a designation that the query is an excess query. The process 600 can continue for other queries when the next query is selected (604).

Figure 7:
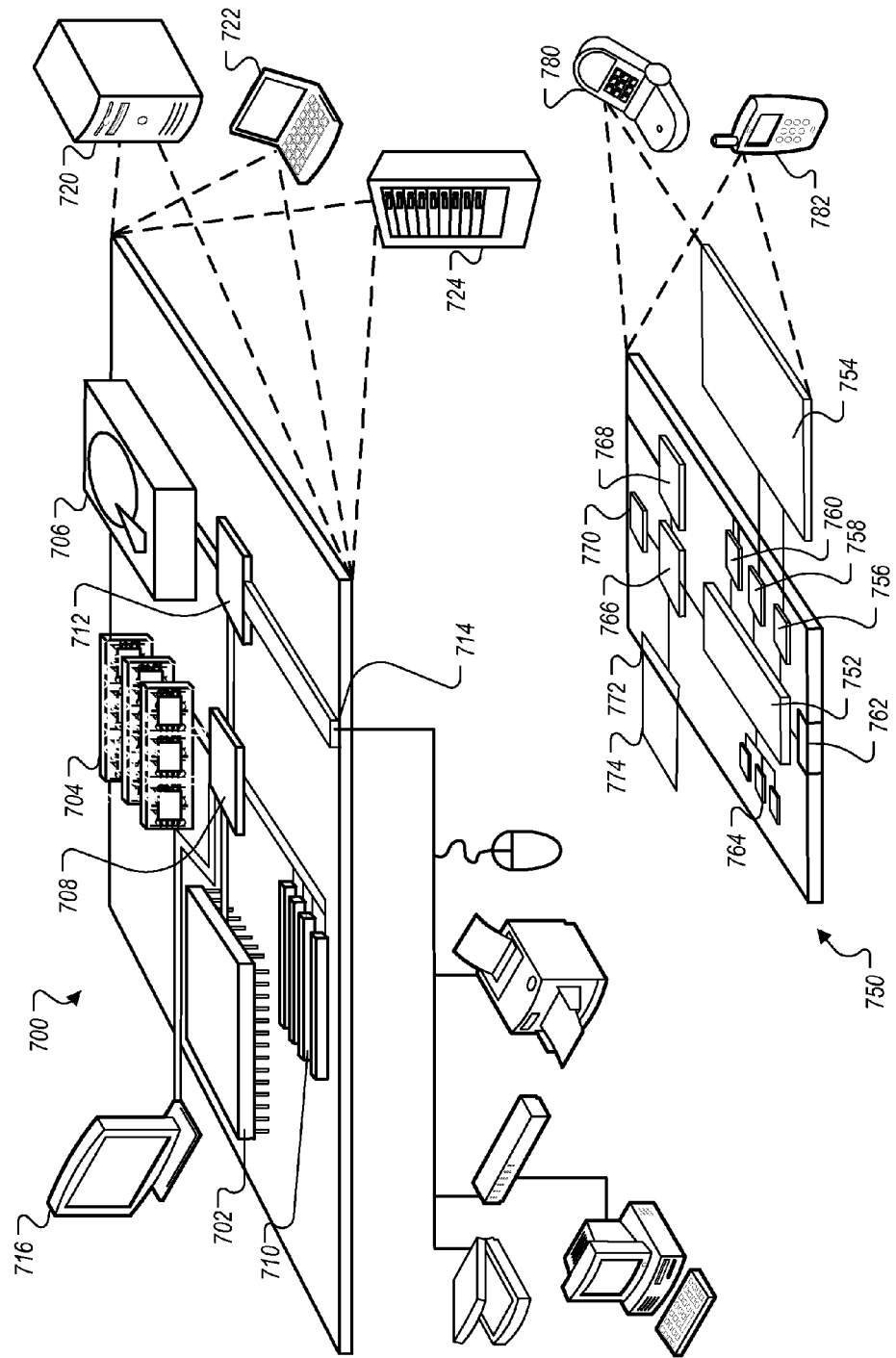
FIG. 7 is a block diagram of computing devices that may be used to implement the systems and methods described in this document.

FIG. 7 is a block diagram of computing devices 700, 750 that may be used to implement the systems and methods described in this document. The computing devices 700, 750 may be implemented as one or more clients or one or more servers, or combinations of clients and servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/ or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   determining excess queries for a target geographic feature, where a geographic feature comprises a particular geographic location for which content is served and where an excess query for a geographic feature comprises a query for which the number of times the query was received for the geographic feature exceeds the number of times the query was expected to be received for the geographic feature;
comparing the excess queries for the target geographic feature to excess queries for one or more other geographic features;
determining a candidate geographic feature of the one or more other geographic features that has similar excess queries as the excess queries for the target geographic feature based on the comparing, where a time when the excess queries for the candidate geographic feature occur is displaced in time from a time when the excess queries for the target geographic feature occur;
determining a time offset between the target geographic feature and the candidate geographic feature based on the displacement in time of the similar excess queries; and
targeting content to the candidate geographic feature using the time offset and based on content targeted to the target geographic feature.

2. The method of claim 1 where each geographic feature is a city.

3. The method of claim 1 where excess queries for a particular geographic feature are determined by:
accessing a search query log that includes data specifying search queries corresponding to the particular geographic feature; and
for at least one of the search queries corresponding to the particular geographic feature:
generating a geo-query count that represents a total number of times that the search query was received over a specified period for the particular geographic feature;
comparing the geo-query count to a corresponding expected query count for the search query, the expected query count being a baseline number of times that the query is expected to be received; and
in response to determining that the search query has a geo-query count that exceeds the corresponding expected query count by at least a threshold amount, classifying the particular query as an excess query for the particular geographic feature.

4. The method of claim 1 further comprising determining excess queries for a geographic feature over multiple time periods, where the multiple time periods are separated in time by one or more intervals.

5. The method of claim 1 where determining the candidate geographic feature includes:
determining that there is a number of common excess queries in common between the excess queries for the target geographic feature and the excess queries for the candidate geographic feature based on the comparing.

6. The method of claim 5, where the number of common excess queries satisfies a condition with respect to a similarity threshold equal to a minimum number of excess queries that must be shared between two geographic features in order to find similarity between excess queries for two geographic features.

7. The method of claim 6 where the number of common excess queries is greater than the similarity threshold.

8. The method of claim 1 where determining the candidate geographic feature includes:
determining a quality shared by the excess queries of the target geographic feature and the excess queries of the candidate geographic feature based on the comparing.

9. The method of claim 8 where the quality for each of the target geographic feature and candidate geographic feature is measured based at least in part on a volume of queries associated with the excess queries for each of the target geographic feature and candidate geographic feature.

10. The method of claim 8 where the quality for each of the target geographic feature and candidate geographic feature is measured based at least in part on click-through rates associated with the excess queries for each of the target geographic feature and candidate geographic feature.

11. The method of claim 8 where the quality is measured using semantic clustering of terms by meaning.

12. The method of claim 1 where determining the candidate geographic feature is based on a number of dissimilar excess queries between the target geographic feature and the candidate geographic feature identified based on the comparing.

13. The method of claim 12 where the determining the candidate geographic feature comprises determining that the number of dissimilar excess queries is below a dissimilarity threshold.

14. The method of claim 1 further comprising:
attributing information associated with the target geographic feature with the candidate geographic feature; and
using the attributed information to target content to the candidate geographic feature.

15. The method of claim 14 where the information is targeting information.

16. The method of claim 14 where the information is a label associated with the target geographic feature.

17. The method of claim 1 where determining excess queries for a given geographic feature includes:
determining an overall total query volume for all queries received for a plurality of geographic features;
for each query of all queries received in the plurality of geographic features:
calculating an overall query volume of the query received across the plurality of geographic features;
determining an overall query share for the query based on the overall total query volume and the overall query volume for the query;
calculating a query volume for the query received for the geographic feature;
calculating a total volume of queries for the given geographic feature;
determining a query share for the query received for the given geographic feature;
comparing the query share for the query to the overall query share for the query; and
identifying the query as an excess query for the given geographic feature based on the comparing the query share for the query to the overall query share for the query.

18. The method of claim 17 further comprising creating a multidimensional array based on the excess queries per geographic feature.

19. The method of claim 18 further comprising using the multidimensional array for the comparing.

20. The method of claim 1, wherein an excess query for the target geographic feature is similar to an excess query for the candidate geographic feature when the query corresponding to the excess query for the target feature and the excess query for the candidate feature is related to the same topic.

* * * * *